July 26, 1966     H. T. NIELSEN ETAL     3,262,642
THERMOSTATICALLY CONTROLLED VALVE AND REGULATOR
Filed Dec. 17, 1963

United States Patent Office 3,262,642
Patented July 26, 1966

3,262,642
THERMOSTATICALLY CONTROLLED VALVE
AND REGULATOR
Helmar Trøst Nielsen, Nordborg, and Knud Aage Hansen, Sonderborg, Denmark, assignors to Danfoss Ved ing. M. Clausen, Nordborg, Denmark, a company of Denmark
Filed Dec. 17, 1963, Ser. No. 330,899
Claims priority, application Germany, Dec. 20, 1962,
D 40,561
1 Claim. (Cl. 236—99)

This invention relates to thermostatically controlled valves and more particularly to a new and improved temperature-sensitive valve operator or regulator for such valves.

Thermostatically controlled valves having temperature-responsive operators or regulators are well known. The valves generally have an adjustable compression or loading spring for variably determining the temperature range in which the valve regulator will open and close the valve. The known temperature-controlled valves make use of threaded adjustment members such as screws or threaded washers or nuts for variably compressing the loading spring for determining the operating range of temperatures of the valves. The threaded screws or nuts generally require the use of an adjustment tool for setting the temperature at which the thermostatically controlled valves operate and require being rotated a considerable number of turns to properly set the operating temperatures.

Since the adjusting members must be rotated a relatively large number of turns for setting the range of operating temperatures corresponding to the compression settings of the spring the temperature indicating scale on such valves is generally graduated such that the graduations thereof are so close together that it is relatively hard to accurately adjust the temperature in view of the compact graduations on the scale. Moreover, these known devices generally require a gear system or other complex systems for moving an indicator or pointer indicating on a scale at a reduced ratio of movement relative to the many rotary turns of the adjustment member. Moreover, in these known valves the adjustment member is generally quite inaccessible.

Furthermore, the known thermostatically-controlled valves must either make use of a relatively resilient long spring if manual adjustment is to be carried out without the assistance of a tool whereby the valve operator requires a considerable space or if a strong short spring is employed a fine thread is required for increasing the power transmitted by the adjustment members in order to axially compress the spring. It is apparent therefore that these known valves are relatively complex and thus expensive to manufacture.

It is a principal object of the present invention to provide a thermostatically-controlled valve obviating the limitations of the known thermostatically-controlled valves.

Another object of the present invention is to provide a thermostatically controlled valve easily and accurately adjustable over a very wide range of operating temperatures.

Still another object of the present invention is to provide a new and improved temperature-sensitive valve regulator and inexpensively constructed without needing complex supplementary indicating devices and actuating devices for variably compressing a loading spring therein.

A feature of the invention is the provision of a temperature-sensitive valve operator in which the housing thereof has a rotatable member cooperative with a spring seat for variably compressing a loading spring which controls and sets the range of temperatures at which valve actuator means in the regulator opens and closes a thermostatically controlled valve.

The spring seat has means enlarging its effective diameter for magnifying its axial travel with respect to a given angular movement of the rotatable member of the valve regulator housing comprising radially extending means, for example radially extending arms, provided with an external thread engaging a complementary internal thread of the rotatable housing member, thereby to provide for a very accurate adjustment of operating temperatures over a relatively wide range of temperatures by angular rotation of the rotatable housing member through no more than one revolution of rotation of the housing member.

Other features, object, and advantages of the thermostatically controlled valve and new and improved temperature-sensitive valve regulator according to the invention will be better understood as described in the following specification and appended claim in conjunction with the following drawings in which:

Figure 1:
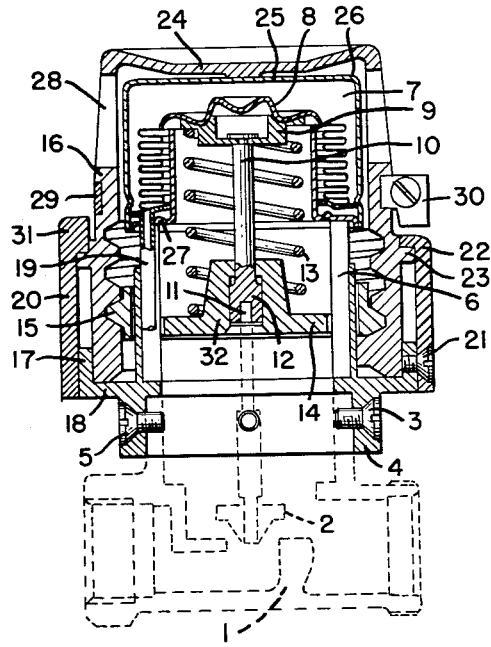
FIG. 1 is a sectional view of a thermostatically controlled valve provided with a temperature-sensitive valve regulator according to the invention.

According to the drawing and more particularly FIG. 1, a thermostatically-controlled valve according to the invention comprises a valve body 1 provided with a seat and a valve member 2 operable to a first position closing the valve and operable to a second position opening the valve upon actuation of a valve stem 3 by a temperature-sensitive valve operator or regulator, hereinafter described. The temperature-sensitive valve regulator comprises a multi-part housing comprising a member 4 for removably mounting the valve regulator, for example with screws 5, on the valve body 1. The valve regulator comprises support means 6 supported on an inwardly extending shoulder of the housing part 4 and axially held in position as illustrated by upwardly extending retaining means on the part 4. The valve regulator comprises a valve actuator 7 comprising an expansion element, for example a bellows supported on the member 6 and having an end cap or closure 8 closing a free end thereof and to which is connected an internal connection means 9 for actuating axially a spindle or valve stem 10 releasably connected to the valve stem 3 by connecting means 11 and enlarged coupling end 12 of the stem 10.

A loading or adjusting spring 13 is seated on an annular seat on the member 9 and on a spring seat 14 disposed circumferentially of the valve stem 10. The spring seat is constructed to engage shoulders, as illustrated, on the enlarged end 12 of the spindle 10 in response to the force of the spring 13 as later explained and is movable axially relative to the stem 10 and in opposite directions axially of the spring 13 for variably compressing the spring 13, as hereinafter explained.

The valve 2 may be biased in a valve opening direction to a position for opening the valve by a spring, not shown, in the valve body 1 and by the inlet pressure of the fluid passing through the valve. The valve regulator and more particularly the valve actuator 7, as hereinafter described, seats the valve member 2 and closes the valve against the action of the loading spring 13 in response to temperature variations.

The spring seat 14 is provided with radial arms as illustrated for supporting a rim 15 on the seat. The radial arms extend radially outwardly of the support member 6 and radial guide of the member 4 through openings therein so that the rim 15 is radially outwardly of the last two mentioned members as illustrated for cooperating with a part of the housing of the valve regulator comprising a rotatable member 16 having a coarse internal thread complementary to and engaging an external thread of the rim 15 as illustrated. The housing member 16 is radially guided by a flange portion 17 and seated on a seat 18 of the housing member 4. An annular retaining member 20 is removably mounted on the flange 17 of the housing part 4 with screws 21 and comprises a radially inwardly extending annular flange 22 overlying and cooperating with an annular shoulder or collar 23 on the rotatable housing member 16 for retaining the rotatable member axially and seated on seat 18.

The housing rotatable element 16 comprises a top part 24 beneath which and engaged therewith is disposed a cup-like cover member 25 of the valve actuator defining a fluid-tight chamber in which is disposed the expansion element or bellows and is filled with an actuating fluid, for example a liquid and gas mixture or saturated vapor, for contracting the bellows in response to temperature variations being sensed by sensing means, not shown, in communication with the interior of the member 25 through a capillary conduit 19. The cup-like member holds the cup-like member in position axially. Internally of the bellows is mounted a tubular member having a radial flange 27 supported on means 6. This tubular member functions as a stop for the bellows in its direction of contraction. The flange 27 is secured to the cover member 25 and through it extends the capillary tube 19 for connecting the chamber defined by the cover 25 with an external sensing bulb, not shown.

The rotatable housing member 16 is provided with an opening 28 providing free access of the ambient air with the cup-like cover 25. In order to indicate the temperature settings of the thermostatically controlled valve according to the invention, a scale or temperature indicating indicia is printed or otherwise secured on a band or annular member 29 which can be adjusted to any desired, fixed angular position by means of clamp means 30. Thus the valve can be easily calibrated according to operating conditions. The clamp 30, moreover, acts as a stop engaging a projection 31 on the retainer 20. Positioning the ring 29 angularly upon loosening of the clamp 30 allows the angular position of the clamp 30 to be set so that the regulator is calibrated according to working conditions. The clamp defines a limit of the temperature range that can be set so that upon engagement of the clamp 30 with the abutment 31 the limit of axial travel of the nut 14 can be limited to a specific range of compression positions so that the temperature is accurately set for the valve actuator at which it will close the valve when this temperature has been sensed and the control fluid or actuating fluid internally of the cover 25 and the chamber defined therein contracts the expansion element sufficiently to seat the valve 2. Moreover, the limit 30 precludes rotating the housing member 16 more than one turn so there is never possibility of overtravel of the spring seat 14 and no possibility of damaging the apparatus by continuing rotation of the rotatable housing control member 16.

Figure 2:
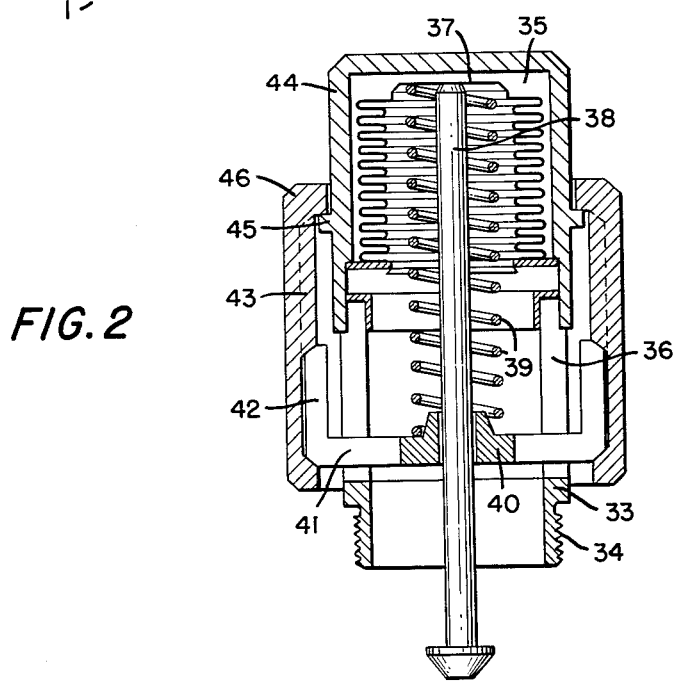
FIG. 2 is a sectional view of a second embodiment of a thermostatically-controlled valve regulator according to the invention.

A second embodiment of a thermostatically-controlled valve and valve regulator according to the invention is illustrated in FIG. 2. In this embodiment, a housing part 33 of the valve regulator has an external thread 34 for mounting the valve regulator on a valve body, not shown. The valve regulator comprises a valve actuator 35 comprising an expansion element or expansible and contractible element as in the first embodiment in the form of a bellows supported on upwardly extending leg portions 36 of the housing member 33. The bellows is fixed at one end and has an opposite free end closed by means 37 for engaging and actuating a valve stem 38 for operating a valve secured to the spindle as illustrated to a valve closing position.

The valve regulator is provided with an internal compression spring 39 having one end seated on the closure member 37 and an opposite end seated on a spring seat or abutment 40 provided with radially extending arms 41 extending through openings in support member 36 and having upwardly extending arms 42 having a coarse external thread thereon cooperating with a complementary thread on a rotatable annular housing member 43 forming a housing for the operator in conjunction with a fixed housing cover 44 defining a fluid-tight chamber internally of which is mounted the valve actuator mechanism 35. The interior of this chamber comprises a fluid for responding to temperature variations being sensed by fluid-filled sensing means, not shown, in communication with the interior of the chamber. The housing member 44 is provided with an annular collar extending radially outwardly thereof which is engaged by a radially inwardly extending annular flange 46 of the rotatable housing member 43 which is rotatable angularly through 360 degrees and in a single rotation thereof variably sets the entire wide range of temperature settings to which the spring can be compressed for controlling a very large range of temperatures at which the regulator functions to control a thermostatically-controlled valve according to the invention.

In the embodiments of the invention disclosed in event the loading spring breaks or if the actuator is defective the regulator would still function to close the valve. If the spring breaks the expansion elements in both embodiments would close the valve. Should the actuator element become defective the spring force could take over, however, by turning the rotatable housing element or control element adjustment of the valve stem toward the valve closing position is possible by decompressing the spring for example, by rotating the control element 16 in a direction for causing the central bell-like portion 32 of the seat spring 14 to engage the large end 12 of the valve stem 10 to actuate it to a valve closing position.

Those skilled in the art will recognize that the valve regulator according to the invention provides easy means of setting the temperature ranges at which the valve regulator functions by rotating a single control member which cooperates with a spring seat for setting a very large range of temperatures in operation and by virtue of the magnification of axial travel of the spring seat by small angular movement of the rotary housing member a highly accurate temperature setting can be obtained by compressing control of the compression of the loading spring in the various embodiments of the invention. The relatively large effective diameter of the spring seats overcomes the limitations of the usual adjustment nuts that have very small diameters and which must be threaded with very fine threads and the same is true of small diameter adjustment screws.

In both embodiments of the invention a large number of the elements of the operator and valve can be made of plastic. For example, as indicated heretofore, the rotatable housing members and the spring seats have a very relatively large diameter thread so that the components can be made of plastic since the large diameter permits absorbing the strength of the spring without having to rely on metallic parts.

While preferred embodiments of the valve and temperature-sensitive operator according to the invention have been shown and described it will be understood that many modifications and changes can be made within the true spirit and scope of the invention.

What we claim and desire to secure by Letters Patent is:

A valve regulator for a thermostatically-controlled valve having a valve member operable to a first position closing said valve and to a second position opening the valve, the valve regulator comprising means for connection in operation to said valve member for opening and closing said valve over a range of temperatures and comprising temperature-responsive valve actuator means comprising an extensible and contractible element operably connected in operation to said valve member to actuate it to said positions, a loading spring cooperative with said element for determining a variable range of temperatures at which said valve is opened and closed, means to variably compress said spring comprising a seat for said spring movable in opposite directions axially of said spring to variably compress it and a multi-part housing for said valve actuator and said spring comprising a rotatable housing control member for moving said seat for said spring in said opposite directions, adjustable stop means for limiting rotary movement of said control member to one turn, said seat having radially extending means having a coarse external thread and comprising a central portion having surfaces for displacing said stem means in a direction for actuating said valve member to said first position, said housing member having an internal thread complementary to the first mentioned thread for variably positioning said spring seat, and said radially extending means and thread being dimensioned to cause upon rotation of said housing control member an angular distance no greater than one turn travel of said spring seat through a range of positions corresponding to the range of temperatures at which said valve is opened and closed, said actuator comprising means comprising a cup-like member defining a chamber for container a temperature-responsive fluid therein, said extensible and contractible element being disposed internally of said chamber for contraction and extension in response to pressure variations developd in said chamber in dependence upon temperature variations, and said housing control member having a portion thereof bearing on said cup-like member for holding it in axial position, said stop means comprising a band mounted on said control member and positionable angularly selectively to different fixed angular positions relative to said control member, and said band having indicia for visually indicating, temperatures in which said operator operates, whereby said operator is calibratable after assembly thereof on a valve to be controlled.

References Cited by the Examiner
UNITED STATES PATENTS

| | | | |
|---|---|---|---|
| 1,415,584 | 2/1922 | Lawler | 236—42 |
| 1,847,911 | 3/1932 | Trane | 236—42 |
| 1,882,803 | 10/1932 | Giesler | 236—42 |
| 1,920,505 | 8/1933 | Henney et al. | 236—92 |
| 2,160,453 | 5/1939 | Boles | 236—92 |
| 2,215,947 | 9/1940 | Wile | 236—99 |
| 3,071,156 | 1/1963 | Porland et al. | |

ALDEN D. STEWART, *Primary Examiner.*